United States Patent
Cai et al.

(10) Patent No.: US 12,165,012 B2
(45) Date of Patent: Dec. 10, 2024

(54) ERROR MITIGATION TECHNIQUES

(71) Applicant: Oxford University Innovation Limited, Botley (GB)

(72) Inventors: Zhenyu Cai, Harrogate (GB); Simon Benjamin, Harrogate (GB)

(73) Assignee: OXFORD UNIVERSITY INNOVATION LIMITED, Oxfordshire (GB)

( * ) Notice: Subject to any disclaimer, the term of this patent is extended or adjusted under 35 U.S.C. 154(b) by 0 days.

(21) Appl. No.: 17/926,147

(22) PCT Filed: Jul. 1, 2021

(86) PCT No.: PCT/EP2021/068261
§ 371 (c)(1),
(2) Date: Nov. 18, 2022

(87) PCT Pub. No.: WO2022/003134
PCT Pub. Date: Jan. 6, 2022

(65) Prior Publication Data
US 2023/0196174 A1 Jun. 22, 2023

(30) Foreign Application Priority Data
Jul. 2, 2020 (EP) .................................... 20183833

(51) Int. Cl.
*G06N 10/70* (2022.01)
*G06F 11/07* (2006.01)
*G06F 17/18* (2006.01)

(52) U.S. Cl.
CPC .......... *G06N 10/70* (2022.01); *G06F 11/0721* (2013.01); *G06F 11/079* (2013.01); *G06F 17/18* (2013.01)

(58) Field of Classification Search
CPC .... G06N 10/70; G06N 10/40; G06F 11/0721; G06F 11/079; G06F 17/18; G06F 17/17; B82Y 10/00
See application file for complete search history.

(56) References Cited

U.S. PATENT DOCUMENTS 11,836,573 B2 * 12/2023 Gottesman ............. G06N 10/00
12,061,953 B2    8/2024 Cai et al.
(Continued)

FOREIGN PATENT DOCUMENTS

WO    WO 2022/003135 A1    1/2022

OTHER PUBLICATIONS

Zhenyu, C. (2021). Multi-exponential error extrapolation and combining error mitigation techniques for NISQ applications. NPJ Quantum Information, 7(1) doi:https://doi.org/10.1038/s41534-021-00404-3 (Year: 2021).*

(Continued)

*Primary Examiner* — Cynthia Britt
(74) *Attorney, Agent, or Firm* — Jenkins, Taylor & Hunt, P.A.

(57) ABSTRACT

A method of mitigating errors in quantum computing, wherein the method comprises: performing (S101) an operation on the state of a qubit in a group of qubits a plurality of times, wherein the operation has a first error rate, and wherein each performance of the operation comprises: performing a first operation comprising: a gate operation, a symmetry operation, and a first basis operation; or performing a second operation comprising: the gate operation, the symmetry operation, and a second basis operation; wherein the first and second basis operations are different basis operations selected from a set of basis operations; and measuring the state of the qubit; wherein the probability of performing the first operation is a first probability, and the probability of performing the second operation is a second probability; obtaining (S102) a symmetry measurement for the group of qubits after each performance of the operation using the symmetry operation, wherein the group of qubits comprises a plurality of qubits; wherein the symmetry measurement is a first symmetry outcome if the number of errors is even or a second symmetry outcome if the number of errors is odd; obtaining (S103) a first state measurement by determining the average state of the qubit for the first symmetry outcome; obtaining (S104) a second state mea- (Continued)

surement by determining the average state of the qubit for the second symmetry outcome; fitting (S105) the first state measurement to a first curve having the form (I); fitting the second state measurement to a second curve having the form (II); wherein n is an error rate and A and γ are fitting parameters; and extrapolating (S106) the average state of the qubit at a second error rate using the first and second fitted curves; wherein the second error rate is lower than the first error rate.

$$\frac{A \cosh((1-\gamma)n)}{\cosh(n)} \quad \text{(I)}$$

$$\frac{A \sinh((1-\gamma)n)}{\sinh(n)} \quad \text{(II)}$$

13 Claims, 4 Drawing Sheets

(56) References Cited

U.S. PATENT DOCUMENTS

2021/0200626 A1\* 7/2021 Rhee ............... G06N 10/00
2023/0196173 A1 6/2023 Cai et al.

OTHER PUBLICATIONS

Written Opinion of the International Searching Authority for International Application No. PCT/EP2021/068262 (Oct. 12, 2021).
International Search Report for International Application No. PCT/EP2021/068262 (Oct. 12, 2021).
Written Opinion of the International Searching Authority for International Application No. PCT/EP2021/068261 (Oct. 7, 2021).
International Search Report for International Application No. PCT/EP2021/068261 (Oct. 7, 2021).
Communication of the extended European search report for European Application No. 20183833.1 (Dec. 23, 2020).
Communication of the extended European search report for European Application No. 20183835.6 (Dec. 23, 2020).
Maciejewski et al., "Mitigation of readout noise in near-term quantum devices by classical post-processing based on detector tomography," arXiv:1907.08518v2, pp. 1-23 (Mar. 25, 2020).
Cai, "Multi-exponential Error Extrapolation and Combining Error Mitigation Techniques for NISQ Applications," arXiv:2007.01265v1, pp. 1-24 (Jul. 2, 2020).
Bonet-Monroig et al., "Low-cost error mitigation by symmetry verification," arXiv:1807.10050v3, pp. 1-11 (Jan. 2, 2019).
Kandala et al., "Error mitigation extends the computational reach of a noisy quantum processor," Nature, vol. 567, pp. 491-501 (Mar. 28, 2019).
Endo et al., "Practical Quantum Error Mitigation for Near-Future Applications," arXiv:1712.09271v2, pp. 1-20 (May 27, 2018).
Cai, "Multi-exponential error extrapolation and combining error mitigation techniques for NISQ application", npj Quantum Information, pp. 1-12 (2021).
Notice of Allowance for U.S. Appl. No. 17/926,146 (Apr. 1, 2024).

\* cited by examiner

ERROR MITIGATION TECHNIQUES

FIELD OF THE INVENTION

The present invention relates to quantum computing and specifically to error mitigation techniques.

BACKGROUND TO THE INVENTION

Quantum computers can be used to compute an "observable", i.e. a property of a system. In order to measure an observable, the output state of a qubit can be measured after performing a sequence of quantum operations on the qubit. The same sequence of quantum operations is typically repeated many times, and an average of the measured output states can be calculated to estimate the expected value of the observable.

However, the sequence of quantum operations performed on the qubit, and thus the estimated expected value, is subject to errors. It is an aim of quantum computation to reduce, or even eliminate, these errors. However, a more realistic approach for near-future quantum devices, or noisy intermediate-scale quantum (NISQ) era quantum devices, is to aim to mitigate these errors using analytical approaches. In this way, the error-free, or noiseless, expected value of the observable can be estimated.

Error mitigation techniques use extra measurements to extract the noise-free expectation values from the noisy measurement results. Some existing error mitigation techniques include symmetry verification, quasi-probability and error extrapolation. Symmetry verification uses known properties of the system to determine whether an error has occurred without needing to measure (and therefore collapse) the state of the qubit. Quasi-probability uses additional gates determined by modelling the error associated with components in the circuit. Error extrapolation involves increasing the noise level by physically altering the hardware and predicting a noise-free expectation value based on the higher noise level measurements. Each of these error mitigation techniques can be employed to mitigate different types of noise.

Symmetry verification is straightforward to perform, but a circuit run which passes the symmetry verification test cannot be taken to be error free, as errors can combine in such a way that the overall error is undetectable using symmetry.

Quasi-probability can eliminate the error. However, the error elimination comes at a very high cost, requiring a high number of repetitions.

Error extrapolation requires the noise level to be increased by an experimentalist. An accurate prediction of the noise-free observable following the increased noise level measurements requires the additional noise to be from the same noise model as the original noise.

It is desirable to develop better error mitigation techniques.

SUMMARY OF THE INVENTION

An aspect of the invention provides a method of mitigating errors in quantum computing. The method comprises: performing an operation on the state of a qubit in a group of qubits a plurality of times. The operation has a first error rate, and each performance of the operation comprises performing a first operation or performing a second operation and measuring the state of the qubit. The first operation comprises: a gate operation, a symmetry operation, and a first basis operation. The second operation comprises: the gate operation, the symmetry operation, and a second basis operation. The first and second basis operations are different basis operations selected from a set of basis operations. The probability of performing the first operation is a first probability, and the probability of performing the second operation is a second probability. The method further comprises: obtaining a symmetry measurement for the group of qubits after each performance of the operation using the symmetry operation, wherein the group of qubits comprises a plurality of qubits; wherein the symmetry measurement is a first symmetry outcome if the number of errors is even or a second symmetry outcome if the number of errors is odd. The method further comprises: obtaining a first state measurement by determining the average state of the qubit for the first symmetry outcome; and obtaining a second state measurement by determining the average state of the qubit for the second symmetry outcome. The method further comprises: fitting the first state measurement to a first curve having the form $$\frac{A\cosh((1-\gamma)n)}{\cosh(n)};$$

fitting the second state measurement to a second curve having the form $$\frac{A\sinh((1-\gamma)n)}{\sinh(n)};$$

wherein n is an error rate and A and $\gamma$ are fitting parameters; and extrapolating the average state of the qubit at a second error rate using the first and second fitted curves; wherein the second error rate is lower than the first error rate.

Advantageously this method of mitigating errors results in an improved estimation of an observable for a reduced cost. The cost is given by the number of times the operation is performed. The method combines quasi-probability, symmetry verification and error extrapolation error mitigation techniques in a synergistic manner.

The first and second state measurements are fitted to first and second curves respectively. A combination of the first and second state measurements can be modelled by an exponential decay curve. An exponential decay curve is advantageous to use as it has been found to be a good model of the relationship between the observable and the error rate. Optionally, the exponential decay curve is a multi-exponential decay curve comprising a summation of two or more exponentials. A multi-exponential decay curve typically has a higher cost in comparison with a single-exponential decay curve but may beneficially provide an improved model of the change in expected value of the observable as a function of error rate.

Typically the gate operation may include any quantum logic gate operation such as a Pauli gate, a Hadamard gate, a SWAP gate, a controlled not (CNOT) gate or a controlled Z gate, for example. The gate operation may comprise a sequence of operations. The first basis operation and the second basis operation can be performed after the gate operation. Typically a basis operation is selected from a set of basis operations. The set of basis operations may comprise sixteen basis operations. Advantageously, any single-qubit operation (which can be represented as a 4×4 matrix) can be expressed as a linear combination of sixteen basis operations. Generally, the number of basis operations in the set of basis operations may be larger to accommodate a greater number of qubits. The set of basis operations may comprise Pauli basis operations. Typically, for n qubits, the set of basis operations may comprise at least $4^n$ Pauli basis operations. Accordingly, each of the first and second basis operations may be one of the Pauli basis operations.

The performance of the operation alternatively may comprise performing a j-th operation comprising: the gate operation, the symmetry operation, and a j-th basis operation. The number of possible operations which may be performed is preferably related to the number of basis operations in the set of basis operations. For example, if there is one gate operation, one qubit, and three basis operations in the set, then there may be three possible operations which may be performed. The probability of performing the j-th operation may be a j-th probability. In this way, a random basis operation may be used to modify the gate operation. This has an advantage that the effective error rate of the operation may be reduced. Optionally, the method may be repeated with a different effective error rate. This may be achieved by altering the first probability and the second probability.

The symmetry measurement is obtained for the group of qubits using the symmetry operation. The symmetry measurement preferably has a known set of symmetry outcomes which may depend on the symmetry operation and the system. The symmetry measurement is a first symmetry outcome or a second symmetry outcome. Optionally, the symmetry measurement is a k-th symmetry outcome, where k may be greater than two. In one example with two symmetry outcomes, the first symmetry outcome is a pass, in which the symmetry measurement aligns with the expected symmetry. In this example, the second symmetry outcome is preferably a fail, in which the symmetry is violated. First and second state measurements are obtained by determining the average state of the qubit for both pass and fail symmetry outcomes. Optionally, a k-th state measurement is obtained by determining the average state of the qubit for the k-th symmetry outcome. This method has an advantage that the measurements which failed the symmetry test are used constructively when estimating the average state of the qubit at the second error rate. This beneficially reduces the cost of performing the error-mitigated operation.

Typically performance of the operation comprises performing the symmetry operation. Optionally, the symmetry operation is a first symmetry operation. The performance of the operation may further comprise performing a second symmetry operation. A symmetry measurement of using the second symmetry operation may be a third symmetry outcome or a fourth symmetry outcome, which may be a pass and a fail respectively. The first symmetry operation may be used to test a first symmetry of the system and the second symmetry operation may be used to test a second symmetry of the system. In this way, multiple properties of the group of qubits may be measured at the same time to provide additional data. Beneficially, the additional data may be used to provide a better estimate of the expected value of the observable.

Preferably a symmetry operation and a basis operation are performed after the gate operation. Optionally, the symmetry operation is performed before the basis operation. Alternatively, the basis operation may be performed before the symmetry operation.

The method may optionally be performed at additional error rates. The effective error rate may be determined by the selection of basis operations and the probabilities with which each basis operation in a set of basis operations is selected. In an example, the method further comprises: performing another operation on the state of the qubit in the group of qubits a plurality of times, wherein the another operation has a third error rate, and wherein each performance of the another operation comprises: performing another first operation comprising: the gate operation, the symmetry operation, and another first basis operation; or performing another second operation comprising: the gate operation, the symmetry operation, and another second basis operation; and measuring the state of the qubit; wherein the probability of performing the another first operation is another first probability and wherein the probability of performing the another second operation is another second probability; obtaining another symmetry measurement for the group of qubits using the symmetry operation; wherein the another symmetry measurement is another first symmetry outcome or another second symmetry outcome; obtaining another first state measurement by determining the average state of the qubit for the another first symmetry outcome; obtaining another second state measurement by determining the average state of the qubit for the another second symmetry outcome; fitting the another first state measurement to another first curve and the another second state measurement to another second curve; and extrapolating the average state of the qubit at a fourth error rate using the another first fitted curve and the another second fitted curve; wherein the fourth error rate is lower than the third error rate.

Advantageously this method results in a different effective error rate, the third error rate, by modifying the gate operation with a random selection of basis operations. Typically the first basis operation, the second basis operation, the another first basis operation and the another second basis operation are selected from the same set of basis operations. Using this method, any i-th error rate may be effected by randomly selecting basis operations from the set of basis operations with different associated probabilities. The probability of selecting a basis operation is preferably theoretically determined.

The qubit in the group of qubits may be a first qubit, and the state of further qubits may be operated on as part of the quantum computation. Preferably, the method further comprises performing the operation on the state of a second qubit in the group of qubits a plurality of times; obtaining a third state measurement by determining the average state of the second qubit for the first symmetry outcome; obtaining a fourth state measurement by determining the average state of the second qubit for the second symmetry outcome; fitting the third state measurement to a third curve and the fourth state measurement to a fourth curve; and extrapolating the average state of the second qubit at the second error rate using the third and fourth fitted curves. There may be any number of qubits in the group of qubits, and the state of each qubit may be operated on in a similar way. Advantageously, this method can be performed on a quantum device as a whole.

Optionally, one or more qubits in the group of qubits may remain idle during the performance of the operation on the state of one or more qubits in the group of qubits. The one or more idle qubits in the group of qubits may be operated on using an identity gate operation. The one or more idle qubits are typically affected by decoherence errors associated with the performance of the identity gate. The symmetry measurement is obtained for the group of qubits after each performance of the operation using the symmetry operation. The symmetry measurement preferably includes the one or more qubits in the groups of qubits which are operated on and the one or more qubits which remain idle.

The qubit (or qubits) may be an electron spin qubit. Preferably, if the qubit is an electron spin qubit, the state of the qubit is the electron spin. Advantageously, electron spin qubits can be easily manipulated and coupled to other electron spin qubits. Preferably the qubit is an electron spin qubit in a silicon-based device, as electron spin qubits in silicon-based devices advantageously have long coherence times and are compatible with existing technologies. Such a device may beneficially be suitable for use in the noisy intermediate-scale quantum computing era.

Another aspect of the invention provides a device for performing quantum computing calculations, comprising: a selection module; a quantum processor; a quantum measurement device; a symmetry measurement device; and a classical processor. The selection module is configured to: select a first basis operation from a set of basis operations with a first probability; and select a second basis operation from a set of basis operations with a second probability; wherein the first and second basis operations are different. The quantum processor is configured to perform an operation on the state of a qubit in a group of qubits a plurality of times, wherein the operation has a first error rate, and wherein each performance of the operation comprises: performing a gate operation, a symmetry operation, and the selected basis operation. The quantum measurement device is configured to measure the state of the qubit.

The symmetry measurement device is configured to measure the symmetry of the group of qubits after each performance of the operation using the symmetry operation, wherein the group of qubits comprises a plurality of qubits; wherein the symmetry measurement is a first symmetry outcome if the number of errors is even or a second symmetry outcome if the number of errors is odd. The classical processor is configured to: obtain a first state measurement by determining the average state of the qubit for the first symmetry outcome and to obtain a second state measurement by determining the average state of the qubit for the second symmetry outcome; fit the first state measurement to a first curve having the form $$\frac{A\cosh((1-\gamma)n)}{\cosh(n)};$$

fit the second state measurement to a second curve having the form $$\frac{A\sinh((1-\gamma)n)}{\sinh(n)};$$

wherein n is an error rate and A and $\gamma$ are fitting parameters; and extrapolate the average state of the qubit at a second error rate using the first and second fitted curves, wherein the second error rate is lower than the first error rate.

This device can advantageously be used to mitigate the effect of noise on the measured expected value of an observable. The selection module is configured to select a first or a second basis operation with a corresponding probability to be performed by a quantum processor following the performance of a gate operation. In this way, the measurements of the state of the qubit may be recombined to estimate an error-mitigated value of an observable. An estimated error-free value of the observable using this device is beneficially both accurate and low cost.

The selection module is preferably further configured to selected a j-th basis operation for $3 \leq j \leq J$, wherein J is preferably the total number of basis operations in a set of basis operations. The set of basis operations may be determined based on a consideration of the theoretically determined noise model, benchmarking experiments and/or the available experimental options.

A further aspect of the invention provides a computer readable memory medium comprising instructions which when executed by a computer cause the computer to carry out steps on a quantum computer comprising: performing an operation on the state of a qubit in a group of qubits a plurality of times, wherein the operation has a first error rate, and wherein each performance of the operation comprises: performing a first operation comprising: a gate operation, a symmetry operation, and a first basis operation; or performing a second operation comprising: the gate operation, the symmetry operation, and a second basis operation; wherein the first and second basis operations are different basis operations selected from a set of basis operations; and measuring the state of the qubit; wherein the probability of performing the first operation is a first probability, and the probability of performing the second operation is a second probability; obtaining a symmetry measurement for the group of qubits after each performance of the operation using the symmetry operation, wherein the group of qubits comprises a plurality of qubits; wherein the symmetry measurement is a first symmetry outcome if the number of errors is even or a second symmetry outcome if the number of errors is odd; obtaining a first state measurement by determining the average state of the qubit for the first symmetry outcome; obtaining a second state measurement by determining the average state of the qubit for the second symmetry outcome; fitting the first state measurement to a first curve having the form $$\frac{A\cosh((1-\gamma)n)}{\cosh(n)};$$

fitting the second state measurement to a second curve having the form $$\frac{A\sinh((1-\gamma)n)}{\sinh(n)};$$

wherein n is an error rate and A and $\gamma$ are fitting parameters; and extrapolating the average state of the qubit at a second error rate using the first and second fitted curves; wherein the second error rate is lower than the first error rate.

Advantageously this computer readable memory medium can be used to determine an error-mitigated value of an observable which has a low estimation error.

An aspect of the invention provides a method of mitigating errors in quantum computing. The method comprises: performing an operation on the state of a qubit in a group of qubits a plurality of times. The operation has a first error rate, and each performance of the operation comprises performing a first operation or performing a second operation and measuring the state of the qubit. The first operation comprises: a gate operation, a symmetry operation, and a first basis operation. The second operation comprises: the gate operation, the symmetry operation, and a second basis operation. The probability of performing the first operation is a first probability, and the probability of performing the second operation is a second probability. The method further comprises: obtaining a symmetry measurement for the group of qubits using the symmetry operation; wherein the symmetry measurement is a first symmetry outcome or a second symmetry outcome. The method further comprises: obtaining a first state measurement by determining the average state of the qubit for the first symmetry outcome; and obtaining a second state measurement by determining the average state of the qubit for the second symmetry outcome. The method further comprises: combining the first state measurement and the second state measurement to estimate the average state of the qubit.

Advantageously this method of mitigating errors results in an improved estimation of an observable for a reduced cost. The cost is given by the number of times the operation is performed. The method combines quasi-probability and symmetry verification error mitigation techniques in a synergistic manner. Quasi-probability can beneficially be used to change the form of the errors in such a way that errors which are undetectable using the symmetry operation can be removed. Furthermore, with knowledge of the relative probabilities of obtaining the first and second symmetry outcomes respectively, the first and second state measurements can be recombined to provide an improved estimate of the error-free observable.

Another aspect of the invention provides a device for performing quantum computing calculations, comprising: a selection module; a quantum processor; a quantum measurement device; a symmetry measurement device; and a classical processor. The selection module is configured to: select a first basis operation from a set of basis operations with a first probability; and select a second basis operation from a set of basis operations with a second probability. The quantum processor is configured to perform an operation on the state of a qubit in a group of qubits a plurality of times, wherein the operation has a first error rate, and wherein each performance of the operation comprises: performing a gate operation, a symmetry operation, and the selected basis operation. The quantum measurement device is configured to measure the state of the qubit. The symmetry measurement device is configured to measure the symmetry of the group of qubits using the symmetry operation; wherein the symmetry measurement is a first symmetry outcome or a second symmetry outcome. The classical processor is configured to: obtain a first state measurement by determining the average state of the qubit for the first symmetry outcome and to obtain a second state measurement by determining the average state of the qubit for the second symmetry outcome; and combine the first state measurement and the second state measurement to estimate the average state of the qubit.

This device can advantageously be used to mitigate the effect of errors on the measured expected value of an observable. The selection module is configured to select a first or a second basis operation with a corresponding probability to be performed by a quantum processor following the performance of a gate operation. Measurements of the state of the qubit are categorised according to the outcome of the symmetry measurement. In this way, the first and second state measurements may be recombined with knowledge of the probability of the first and second symmetry outcomes to estimate an error-mitigated value of an observable.

A further aspect of the invention provides a computer readable memory medium comprising instructions which when executed by a computer cause the computer to carry out steps on a quantum computer comprising: performing an operation on the state of a qubit in a group of qubits a plurality of times, wherein the operation has a first error rate, and wherein each performance of the operation comprises: performing a first operation comprising: a gate operation, a symmetry operation, and a first basis operation; or performing a second operation comprising: the gate operation, the symmetry operation, and a second basis operation; and measuring the state of the qubit; wherein the probability of performing the first operation is a first probability, and the probability of performing the second operation is a second probability; obtaining a symmetry measurement for the group of qubits using the symmetry operation; wherein the symmetry measurement is a first symmetry outcome or a second symmetry outcome; obtaining a first state measurement by determining the average state of the qubit for the first symmetry outcome; obtaining a second state measurement by determining the average state of the qubit for the second symmetry outcome; and combining the first state measurement and the second state measurement to estimate the average state of the qubit.

Advantageously this computer readable memory medium can be used to more accurately determine an error-mitigated value of an observable.

An aspect of the invention provides a method of mitigating errors in quantum computing. The method comprises: performing a first operation on the state of a qubit, wherein the first operation has a first error rate; obtaining a first measurement of the state of the qubit; performing a second operation on the state of the qubit, wherein the second operation has the first error rate; obtaining a second measurement of the state of the qubit; calculating a first average value of the state of the qubit at the first error rate by averaging the first measurement and the second measurement; performing a third operation on the state of the qubit, wherein the third operation has a second error rate which is lower than the first error rate and wherein the third operation comprises the first operation and a first basis operation; obtaining a third measurement of the state of the qubit; performing a fourth operation on the state of the qubit, wherein the fourth operation has the second error rate and wherein the fourth operation comprises the first operation and a second basis operation; wherein the first and second basis operations are different basis operations selected from a set of basis operations; obtaining a fourth measurement of the state of the qubit; and calculating a second average value of the state of the qubit at the second error rate by averaging the third measurement and the fourth measurement. The method further comprises: fitting the first average value of the state of the qubit and the second average value of the state of the qubit to a curve; and extrapolating the average stage of the qubit at a third error rate using the fitted curve, wherein the third error rate is lower than the first error rate and the second error rate.

Advantageously this method of mitigating errors results in an improved estimation of an observable for a reduced cost. The method combines quasi-probability and error extrapolation error mitigation techniques in a synergistic manner.

The first basis operation and the second basis operation are selected from a set of basis operations. The selection is preferably random with a weighted probability of selecting a particular basis operation. Optionally the probability of selecting the first basis operation is a first probability, and the probability of selecting the second basis operation is a second probability. The set of basis operations may further comprise additional basis operations each with a corresponding probability of being selected. In this way, a random basis operation may be used to modify the first operation. This has an advantage that the effective error rate of the operation may be reduced from the first error rate to the second error rate. The second error rate may depend on the selection probabilities of each of the basis operations.

The first and second operations both have the first error rate. The first average value is calculated by averaging the first measurement and the second measurement. Preferably, the second operation is the same as the first operation. Furthermore, the first operation is typically repeated a plurality of times and the first average value of the state of the qubit at the first error rate can be calculated by averaging each of the resulting measurements. Each measurement is either a +1 or a −1, corresponding to the two states of the qubit respectively. Performing the first operation a plurality of times has the advantage that the uncertainty in the expected value of the observable at the first error rate is reduced.

The third and fourth operations comprise first and second basis operations respectively in addition to the first operation. Optionally, the first and second basis operations are Pauli basis operations. The Pauli basis operations typically include an identity operation. Further modified operations may be performed using further basis operations. Each of the first, second, and any additional basis operations may be randomly selected from a set of basis operations. In this way, the effective error rate may beneficially be reduced in comparison with performance of the first operation without the random sampling of modified operations.

The qubit is preferably one of a plurality of qubits in a group of qubits. The state of each qubit in the group of qubits may be transformed by performing an operation or a sequence of operations. Advantageously, this error mitigation method can be applied to a quantum device comprising a plurality of qubits.

The qubits may be electron spin qubits. Preferably, if the qubits are electron spin qubits, the state of the qubit is the electron spin. Measurements of the state of the qubit typically return either spin up $|\uparrow\rangle$ or spin down $|\downarrow\rangle$. Advantageously, electron spin qubits can be easily manipulated and coupled to other electron spin qubits. Preferably the qubits are electron spin qubits in silicon-based devices, advantageously providing long coherence times and compatibility with existing technologies.

The first and second average values are fitted to a curve. Optionally the curve is an exponential decay curve. An exponential decay curve is advantageous to use as it typically is a good model of the relationship between the observable and the error rate. Optionally, the exponential decay curve is a multi-exponential decay curve comprising a summation of two or more exponentials. The multi-exponential decay curve is preferably of the form $E=\sum_{k=1}^{K} A_k e^{-\gamma_k n}$, wherein E is the average state of the qubit, n is an error rate, and $A_k$ and $\gamma_k$ are fitting parameters. A multi-exponential decay curve typically has a higher cost in comparison with a single-exponential decay curve but may beneficially provide an improved model of the change in expected value of the observable as a function of error rate.

Another aspect of the invention provides a device for performing quantum computing calculations, comprising: a selection module; a quantum processor; a quantum measurement device; and a classical processor. The selection module is configured to select a basis operation from a set of basis operations comprising a first basis operation and a second basis operation, wherein the first and second basis operations are different. The quantum processor is configured to: perform a first operation on the state of a qubit, wherein the first operation has a first error rate; perform a second operation on the state of the qubit, wherein the second operation has the first error rate; perform a third operation on the state of the qubit, wherein the third operation has a second error rate which is lower than the first error rate and wherein the third operation comprises the first operation and the first basis operation; and perform a fourth operation on the state of the qubit, wherein the fourth operation has the second error rate and wherein the fourth operation comprises the first operation and the second basis operation. The quantum measurement device is configured to obtain first, second, third and fourth measurements after the performance of the first, second, third and fourth operations respectively. The classical processor is configured to: calculate a first average value of the state of the qubit at the first error rate by averaging the first measurement and the second measurement; calculate a second average value of the state of the qubit at the second error rate by averaging the third measurement and the fourth measurement; fit the first average value of the state of the qubit and the second average value of the state of the qubit to a curve; and extrapolate the average state of the qubit at a third error rate using the fitted curve, wherein the third error rate is lower than the first error rate and the second error rate.

Advantageously this device can be used to mitigate the effect of errors on the measured expected value of an observable. An estimated noiseless value of the observable using this device is beneficially both accurate and low cost.

A further aspect of the invention provides a computer readable memory medium comprising instructions which when executed by a computer cause the computer to carry out steps on a quantum computer comprising: performing a first operation on the state of a qubit, wherein the first operation has a first error rate; obtaining a first measurement of the state of the qubit; performing a second operation on the state of the qubit, wherein the second operation has the first error rate; obtaining a second measurement of the state of the qubit; calculating a first average value of the state of the qubit at the first error rate by averaging the first measurement and the second measurement; performing a third operation on the state of the qubit, wherein the third operation has a second error rate which is lower than the first error rate and wherein the third operation comprises the first operation and a first basis operation; obtaining a third measurement of the state of the qubit; performing a fourth operation on the state of the qubit, wherein the fourth operation has the second error rate and wherein the fourth operation comprises the first operation and a second basis operation; wherein the first and second basis operations are different basis operations selected from a set of basis operations; obtaining a fourth measurement of the state of the qubit; calculating a second average value of the state of the qubit at the second error rate by averaging the third measurement and the fourth measurement; fitting the first average value of the state of the qubit and the second average value of the state of the qubit to a curve; and extrapolating the average stage of the qubit at a third error rate using the fitted curve, wherein the third error rate is lower than the first error rate and the second error rate.

Advantageously this computer readable memory medium can be used to determine an error-mitigated value of an observable which has a low estimation error.

Another aspect of the invention provides a method of mitigating errors in quantum computing. The method comprises: performing an operation on the state of a qubit in a group of qubits a plurality of times. The operation has a first error rate, and each performance of the operation comprises performing a first operation or performing a second operation and measuring the state of the qubit. The first operation comprises: a gate operation, a symmetry operation, and a first basis operation. The second operation comprises: the gate operation, the symmetry operation, and a second basis operation. The probability of performing the first operation is a first probability, and the probability of performing the second operation is a second probability. The method further comprises: obtaining a symmetry measurement for the group of qubits using the symmetry operation; wherein the symmetry measurement is a first symmetry outcome or a second symmetry outcome. The method further comprises: obtaining a first state measurement by determining the average state of the qubit for the first symmetry outcome; and obtaining a second state measurement by determining the average state of the qubit for the second symmetry outcome. The method further comprises: fitting the first state measurement to a first curve and the second state measurement to a second curve; and extrapolating the average state of the qubit at a second error rate using the first and second fitted curves; wherein the second error rate is lower than the first error rate.

A further aspect of the invention provides a device for performing quantum computing calculations, comprising: a selection module; a quantum processor; a quantum measurement device; a symmetry measurement device; and a classical processor. The selection module is configured to: select a first basis operation from a set of basis operations with a first probability; and select a second basis operation from a set of basis operations with a second probability. The quantum processor is configured to perform an operation on the state of a qubit in a group of qubits a plurality of times, wherein the operation has a first error rate, and wherein each performance of the operation comprises: performing a gate operation, a symmetry operation, and the selected basis operation. The quantum measurement device is configured to measure the state of the qubit. The symmetry measurement device is configured to measure the symmetry of the group of qubits using the symmetry operation; wherein the symmetry measurement is a first symmetry outcome or a second symmetry outcome. The classical processor is configured to: obtain a first state measurement by determining the average state of the qubit for the first symmetry outcome and to obtain a second state measurement by determining the average state of the qubit for the second symmetry outcome; fit the first state measurement to a first curve and the second state measurement to a second curve; and extrapolate the average state of the qubit at a second error rate using the first and second fitted curves, wherein the second error rate is lower than the first error rate.

Another aspect of the invention provides a computer readable memory medium comprising instructions which when executed by a computer cause the computer to carry out steps on a quantum computer comprising: performing an operation on the state of a qubit in a group of qubits a plurality of times, wherein the operation has a first error rate, and wherein each performance of the operation comprises: performing a first operation comprising: a gate operation, a symmetry operation, and a first basis operation; or performing a second operation comprising: the gate operation, the symmetry operation, and a second basis operation; and measuring the state of the qubit; wherein the probability of performing the first operation is a first probability, and the probability of performing the second operation is a second probability; obtaining a symmetry measurement for the group of qubits using the symmetry operation; wherein the symmetry measurement is a first symmetry outcome or a second symmetry outcome; obtaining a first state measurement by determining the average state of the qubit for the first symmetry outcome; obtaining a second state measurement by determining the average state of the qubit for the second symmetry outcome; fitting the first state measurement to a first curve and the second state measurement to a second curve; and extrapolating the average state of the qubit at a second error rate using the first and second fitted curves; wherein the second error rate is lower than the first error rate.

An aspect of the invention provides a method of mitigating errors in quantum computing. The method comprises: performing a first operation on the state of a qubit, wherein the first operation has a first error rate; obtaining a first measurement of the state of the qubit; performing a second operation on the state of the qubit, wherein the second operation has the first error rate; obtaining a second measurement of the state of the qubit; calculating a first average value of the state of the qubit at the first error rate by averaging the first measurement and the second measurement; performing a third operation on the state of the qubit, wherein the third operation has a second error rate which is lower than the first error rate and wherein the third operation comprises the first operation and a first basis operation; obtaining a third measurement of the state of the qubit; performing a fourth operation on the state of the qubit, wherein the fourth operation has the second error rate and wherein the fourth operation comprises the first operation and a second basis operation; obtaining a fourth measurement of the state of the qubit; and calculating a second average value of the state of the qubit at the second error rate by averaging the third measurement and the fourth measurement. The method further comprises: fitting the first average value of the state of the qubit and the second average value of the state of the qubit to a curve; and extrapolating the average stage of the qubit at a third error rate using the fitted curve, wherein the third error rate is lower than the first error rate and the second error rate.

Another aspect of the invention provides a device for performing quantum computing calculations, comprising: a selection module; a quantum processor; a quantum measurement device; and a classical processor. The selection module is configured to select a basis operation from a group of basis operations comprising a first basis operation and a second basis operation. The quantum processor is configured to: perform a first operation on the state of a qubit, wherein the first operation has a first error rate; perform a second operation on the state of the qubit, wherein the second operation has the first error rate; perform a third operation on the state of the qubit, wherein the third operation has a second error rate which is lower than the first error rate and wherein the third operation comprises the first operation and the first basis operation; and perform a fourth operation on the state of the qubit, wherein the fourth operation has the second error rate and wherein the fourth operation comprises the first operation and the second basis operation. The quantum measurement device is configured to obtain first, second, third and fourth measurements after the performance of the first, second, third and fourth operations respectively. The classical processor is configured to: calculate a first average value of the state of the qubit at the first error rate by averaging the first measurement and the second measurement; calculate a second average value of the state of the qubit at the second error rate by averaging the third measurement and the fourth measurement; fit the first average value of the state of the qubit and the second average value of the state of the qubit to a curve; and extrapolate the average state of the qubit at a third error rate using the fitted curve, wherein the third error rate is lower than the first error rate and the second error rate.

A further aspect of the invention provides a computer readable memory medium comprising instructions which when executed by a computer cause the computer to carry out steps on a quantum computer comprising: performing a first operation on the state of a qubit, wherein the first operation has a first error rate; obtaining a first measurement of the state of the qubit; performing a second operation on the state of the qubit, wherein the second operation has the first error rate; obtaining a second measurement of the state of the qubit; calculating a first average value of the state of the qubit at the first error rate by averaging the first measurement and the second measurement; performing a third operation on the state of the qubit, wherein the third operation has a second error rate which is lower than the first error rate and wherein the third operation comprises the first operation and a first basis operation; obtaining a third measurement of the state of the qubit; performing a fourth operation on the state of the qubit, wherein the fourth operation has the second error rate and wherein the fourth operation comprises the first operation and a second basis operation; obtaining a fourth measurement of the state of the qubit; calculating a second average value of the state of the qubit at the second error rate by averaging the third measurement and the fourth measurement; fitting the first average value of the state of the qubit and the second average value of the state of the qubit to a curve; and extrapolating the average stage of the qubit at a third error rate using the fitted curve, wherein the third error rate is lower than the first error rate and the second error rate.

BRIEF DESCRIPTION OF THE DRAWINGS

Embodiments of the invention will now be described with reference to the accompanying drawings in which.

DETAILED DESCRIPTION

Figure 1:
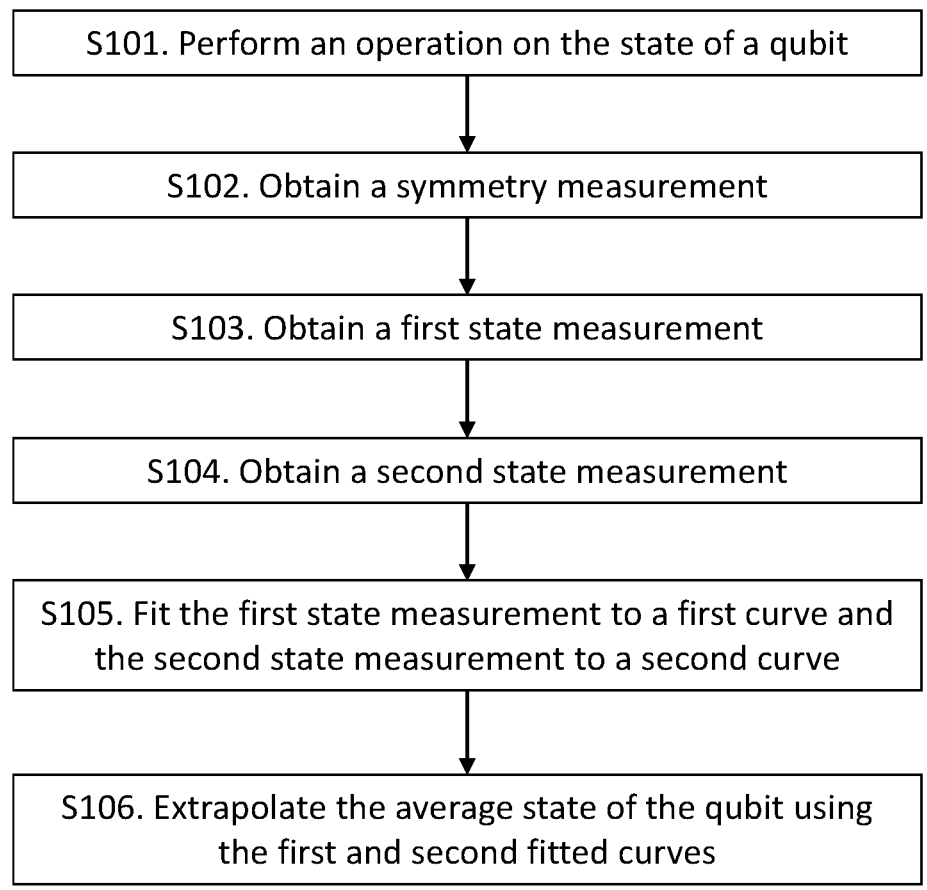
FIG. 1 is a flow chart of an error mitigation method in accordance with a first embodiment.

FIG. 1 is a flow chart depicting an error mitigation method according to an embodiment. In this embodiment, a combination of quasi-probability, symmetry verification and error extrapolation is used.

A quantum computation typically involves: initialising a group of qubits; performing a sequence of quantum operations on the group of qubits; and measuring the output state of each of the qubits. Measurements can also be performed on the group of qubits as a whole. The sequence of quantum operations has an associated error.

In step S101, an operation is performed on the state of a qubit in a group of qubits using a quantum processor. The operation has a first error rate and is performed a plurality of times. The first error rate, $n_1$, is the number of errors which are expected to occur each time the operation is performed. The actual number of errors which occur each time will vary, but the average number of errors for a plurality of operations will be approximately equal to $n_1$. Errors including dephasing errors and depolarising errors may occur at a number of possible error locations, M. It is assumed that the number of possible error locations is large and that the first error rate is on the order 1, i.e. $M \gg 1$; $n_1 \sim 1$.

Each time the operation is performed, the state of the qubit following the operation is measured using a quantum measurement device. After performing the operation a plurality of times, an expected value of the state of the qubit can be obtained by averaging the individual measurements using a classical processor. This expected value can be mapped to a physical quantity of the system such as a position or a momentum and is sometimes referred to as an observable.

The operation performed in step S101 includes a gate operation and additional operations. The gate operation includes one or more quantum logic gate operations. Any quantum gate or series of quantum gates may be selected according to the requirements of the experiment. The additional operations are performed after the gate operation and are used to mitigate the errors arising from the performance of the gate operation. The additional operations include a symmetry operation used to mitigate the errors using symmetry verification, and a basis operation used to mitigate the errors using quasi-probability. The symmetry verification and quasi-probability error mitigation techniques will be discussed below.

Without any error mitigation, a noisy measurement of the observable can be obtained using the gate operation. The gate operation is chosen by an experimentalist based on the observable to be measured. The aim of error mitigation techniques is to estimate the value of the observable had the gate operation been noiseless or noise-free. The noisy gate operation, $U_n$, may be expressed as the noise-free operation, $U_0$, followed by a noise operation, M, i.e. $U_n = MU_0$.

In the quasi-probability error mitigation technique, the inverse noise, $M^{-1}$, may be expressed as a function of each basis operation, $B_j$, in a set of basis operations where $1 \leq j \leq J$ and J is the number of basis operations in the set. In this embodiment, a Pauli basis is used in which there are four different basis operations in the set, J=4. A Pauli basis operation, $B_j$, acting on the state, s, of a qubit, can be written $B_j s = b_j s b_j^\dagger$, where $$b_1 = \begin{bmatrix} 1 & 0 \\ 0 & 1 \end{bmatrix}, \ b_2 = \begin{bmatrix} 0 & 1 \\ 1 & 0 \end{bmatrix}, \ b_3 = \begin{bmatrix} 0 & -i \\ i & 0 \end{bmatrix}, \text{ and } b_4 = \begin{bmatrix} 1 & 0 \\ 0 & -1 \end{bmatrix},$$

and where $b_j^\dagger$ is the transposed complex conjugate of $b_j$. The inverse noise may be expressed as $M^{-1} = a_1 B_1 + a_2 B_2 + a_3 B_3 + a_4 B_4$, in which $a_j$ are numerical coefficients.

In order to estimate the effect of the noise-free operation, a basis operation can be performed after the gate operation. The basis operation is randomly selected by a selection module. In this case, for one gate operation and three basis operations, the possible operations are: $B_1 U_n$, $B_2 U_n$, $B_3 U_n$ and $B_4 U_n$. The j-th basis operation is selected by the selection module with a probability proportional to $|a_j|$.

In alternative embodiments, additional gate operations can be performed and different basis operations from the set of basis operations may be selected. This increases the number of possible operations which can be selected by the selection module. Therefore, mitigating the effect of the noise-free operation using quasi-probability typically requires a very large number of operations to be performed.

In this embodiment, quasi-probability is used to reduce, rather than eliminate the error. The cost, C, of using quasi-probability to reduce the error rate from the natural error rate, n, to the first error rate, $n_1$, is approximately $C \approx e^{4(n-n_1)}$.

Accordingly, the cost of a small reduction in the error is significantly less than the cost of a large reduction, or the complete elimination, of the error.

The use of quasi-probability to reduce rather than eliminate the error advantageously is lower cost and therefore requires fewer repetitions of the operation. The noisy gate operation, $U_n$, can be transformed to a gate operation with the first error rate, $U_{n1}$, in which the first error rate is lower than the error rate of the noisy gate operation $U_n$, $n_1 < n$. The relationship between the original and reduced-error operations can be expressed as $U_n = NU_{n1}$.

The transformation, $N^{-1}$, can be expressed as a function of basis operations $N^{-1} = p_1 B_1 + p_2 B_2 + p_3 B_3 + p_4 B_4$, and each basis operation can be included in a performance of the operation with a probability proportional to $|p_j|$ for $j=1, 2, 3, 4$. For example, if $p_1 = 0.1$, $p_2 = -0.2$, $p_3 = 0.8$ and $p_4 = 0.3$ and the operation is performed 140 times, the first operation, $B_1 U_n$, will be performed approximately 10 times, the second operation, $B_2 U_n$, will be performed approximately 20 times, the third operation, $B_3 U_n$, will be performed approximately 80 times, and the fourth operation, $B_4 U_n$, will be performed approximately 30 times.

Accordingly, each operation performed in step S101 includes a j-th basis operation following the gate operation. An operation which is modified using the j-th basis operation may be referred to as the j-th operation. The operation is performed a plurality of times, and each possible modified operation is performed a plurality of times according to the probability $|p_j|$. Typically step S101 includes performing a set of modified operations on the state of each qubit in the group of qubits.

In the symmetry verification error mitigation technique, a symmetry operation is performed and a symmetry measurement is taken. In a quantum computation, some properties of the system are known and can be verified. For example, regardless of the particular state of each electron, the number of electrons in a system should remain fixed. If an error occurs, it may appear as the loss or gain of an electron.

However, the occurrence of multiple errors cannot easily be distinguished using symmetry verification, as the symmetry operation is performed on the group of qubits as a whole. In the example above, the symmetry operation may only be able to determine whether the overall number of electrons is odd or even. The outcome of the symmetry measurement following the performance of the symmetry operation would be a fail if the number of electrons changed by ±1, ±3, ±5 etc. A failed symmetry test is an indication that at least one error occurred. The outcome would be a pass if the number of electrons did not change, but would also be a pass if the number changed by ±2, ±4, ±6 etc. Measurements which fail the symmetry verification test are typically discarded in existing error mitigation techniques as it is known that at least one error occurred. However, it cannot be concluded from a passed symmetry verification test that no errors occurred.

Each operation performed in step S101 includes a symmetry operation, S. The noisy gate operation, $U_n$, may include errors in a form which is undetectable using the chosen symmetry operation. Therefore, in this embodiment, the quasi-probability technique is used to remove components of the error which are locally undetectable using symmetry. It is noted from the above description of the symmetry verification technique that the remaining locally detectable errors may recombine to form globally undetectable errors. The symmetry measurement is performed globally.

The symmetry operation and basis operation performed after the gate operation in step S101 can be performed in either order following the gate operation. A first possible operation performed on a qubit in the group of qubits includes performing the gate operation, $U_n$, followed by the symmetry operation, S, followed by a first basis operation, $B_1$, with the first basis operation selected by the selection module with a first probability proportional to $|p_1|$. The first basis operation may change the symmetry of the system and modify our pass/fail criterion of the symmetry verification accordingly. The state of the qubit is measured by a quantum measurement device following the performance of the sequence of operations in the first operation.

A second possible operation performed on the qubit in the group of qubits includes performing the gate operation, $U_n$, followed by a second basis operation, $B_2$, followed by the symmetry operation, S, with the second basis operation selected by the selection module with a second probability proportional to $|p_2|$. Similarly, the state of the qubit is measured by the quantum measurement device following the performance of the sequence of operations in the second operation.

The state of the qubit is generally a superposition of a first state $|0\rangle$ and a second state $|1\rangle$. However, when measured, the state of the qubit will be either the first state or the second state, i.e. 0 or 1, which corresponds to the measurement outcome −1 or +1 respectively.

The first and second states differ depending on the type of qubit. Accordingly, the measured property of the qubit depends on the type of qubit. The quantum measurement device is selected to correspond to the type of qubit. For example, the first and second states of an electron spin qubit are spin up and spin down, with spin up recorded as a +1, and spin down recorded as a −1. Therefore a measurement of an electron spin qubit is obtained by measuring the electron spin, and the quantum measurement device is configured to measure electron spin.

The electron charge is measured if the qubit is an electron charge qubit, in which the first and second states are no electrons and one electron. The excitation state is measured if the qubit is a superconducting phase qubit, in which the first and second states are the ground state and the first excited state. Any quantum system with first and second measurable states can be used as a qubit. A suitable quantum measurement device which enables the first and second states to be distinguished is used to obtain the measurements.

By performing the operation in step S101 a plurality of times, the average state of the qubit can be determined. Using the relationship between the original operation, $U_n$, and reduced-error operation, $U_{n1}$, $N^{-1} U_n = U_{n1}$, with $N^{-1} = p_1 B_1 + p_2 B_2 + p_3 B_3 + p_4 B_4$, it can be seen that measurements taken following the performance of modified operations in which different basis operations $B_1$ are sampled with a probability proportional to $|p_j|$ can be recombined computationally to determine the effect of the reduced error-operation on the state of the qubit. The measurements are assigned parity of ±1 depending on the sign of the coefficient, $p_j$. For example, if $p_2 = -0.2$ and the state of the qubit following the performance of $SB_2 U_n$ is measured to be 1, the measurement is recorded as −1.

In step S102, a symmetry measurement is obtained using a symmetry measurement device for the group of qubits using the symmetry operation. The group of qubits comprises a plurality of qubits. The symmetry measurement is obtained S102 after each performance of the operation S101. The symmetry measurement is either a first symmetry outcome if the number of errors is even, a 'pass', or a second symmetry outcome if the number of errors is odd, a 'fail'. Examples of properties of the system that can be used to perform the symmetry verification test include parity, particle number, and energy. In the existing symmetry verification technique the measurements which fail the symmetry test are discarded. However in this embodiment every measurement is kept and categorised according to its symmetry outcome. This reduces the cost of the error mitigation technique of this embodiment. Measurements which fail the symmetry verification test can nevertheless be used constructively using the method and analysis described below.

In this embodiment, a single symmetry operation is performed following the gate operation. In an alternative embodiment, more than one symmetry operation is used. Typically each symmetry operation is used to verify the symmetry of a different property of the system, and returns a pass or fail outcome.

In step S103, a first state measurement, $E_{pass}$, is obtained. The measurements of the state of the qubit following the performance of the operation in step S101 which were categorised as a 'pass' following the symmetry categorisation in step S102 are averaged using a classical processor. The averaged measurements are taken from the set of j-th operations performed. The weighted sampling of possible basis operations $B_j$ according to the determined coefficients $p_j$ experimentally recreates the theoretically determined transformation $N^{-1}$.

In step S104, a second state measurement, $E_{fail}$, is obtained in which the measurements categorised as a 'fail' in step S102 are averaged using the classical processor. The first state measurement and the second state measurement will be different as the probability of an even number of errors occurring and the probability of an odd number of errors occurring are different. The probability of an even number of errors occurring at the first error rate, $n_1$, is $P_{even}=e^{-n_1} \cos h(n_1)$. The probability of an odd number of errors occurring at the first error rate is $P_{odd}=e^{-n_1} \sin h(n_1)$. The measurements obtained in steps S102, S103 and S104 may be obtained at the same time.

In an alternative embodiment in which more than one symmetry operation is performed, additional state measurements may be obtained. For example, if two symmetry operations are performed and each one has a pass or fail outcome, four state measurements will be measured corresponding to pass-pass, pass-fail, fail-pass and fail-fail.

In step S105, the first and second state measurements are fitted to a first and a second curve respectively using the classical processor of a conventional computer. This is the error mitigation technique of extrapolation. The expected value of the observable, i.e. the average of the individual measurements of the state of the qubit, is dependent on the level of noise. Assuming the relationship between the expected value of the observable and the noise level, or error rate, follows a trend, the measured state measurements can be fitted to a trend and used to predict the expected value of the observable at lower noise.

In this embodiment, it is assumed that the expected value of the observable decays exponentially with increasing error rate. The first and second state measurements result from the operation performed in step S101 with the first error rate, but as the probability of passing or failing the symmetry verification test is different, the two state measurements will result in different measured expectation values. The first curve which is used to fit the first state measurement has the form $$\frac{A \cosh((1-\gamma)n)}{\cosh(n)},$$

in which A and $\gamma$ are fitting parameters and n is an error rate. The second curve which is used to fit the second state measurement has the form $$\frac{A \sinh((1-\gamma)n)}{\sinh(n)}.$$

At the first error rate, the expected value of the state of the qubit can be expressed as $E_{n1}=P_{even}E_{pass}+P_{odd}E_{fail}$. In an alternative embodiment, this estimate of the expected value of the state of the qubit, using the combination of the probabilities of the first and second symmetry outcomes $P_{even}$, $P_{odd}$, and the first and second state measurements $E_{pass}$, $E_{fail}$, can be used to provide an error-mitigated value of the observable.

In this embodiment, the error is further mitigated using error extrapolation along with an assumption that the value of the observable decays approximately exponentially with error rate. The two categories of measurements, i.e. passed and failed measurements, taken at a single error rate can be used to determine the noise-free expectation value assuming that the exponential decay curve is a single exponential decay, i.e. $E_n=Ae^{-\gamma n}$, in which $E_n$ is the average state of the qubit, n is an error rate, and A and $\gamma$ are fitting parameters.

In an alternative embodiment, the curve is a multi-exponential decay curve comprising a summation of two or more exponentials, i.e.

$$E = \sum_{k=1}^{K} A_k e^{-\gamma_k n},$$

for K>1. In order to ensure that the fitting parameters adequately reflect the relationship between the expected value of the observable and the error rate, there should be enough data points. For example, a dual-exponential decay curve in which K=2 requires a minimum of four measurements in order to determine the four free fitting parameters $A_1$, $A_2$, $\gamma_1$ and $\gamma_2$. This can be achieved using two symmetry operations and four state measurements as described above. Alternatively, or in addition, an operation may be performed at another error rate to obtain additional measurements of the state of the qubit under different modified operations.

In step S106, the average state of the qubit is extrapolated at a second error rate lower than the first error rate using the classical processor. In this embodiment, the second error rate is chosen to be a zero error rate such that a noise-free expectation value can be estimated.

Using the first and second fitted curves from step S105, the noise-free expectation value, $E_0$, can be determined by combining the first and second state measurements, $E_{pass}$ and $E_{fail}$ respectively using the following equation.

$$E_0 = \text{sgn}(E_{pass}) \times \sqrt{E_{pass}^2 \cosh^2(n_1) - E_{fail}^2 \sinh^2(n_1)}$$

Figure 2:
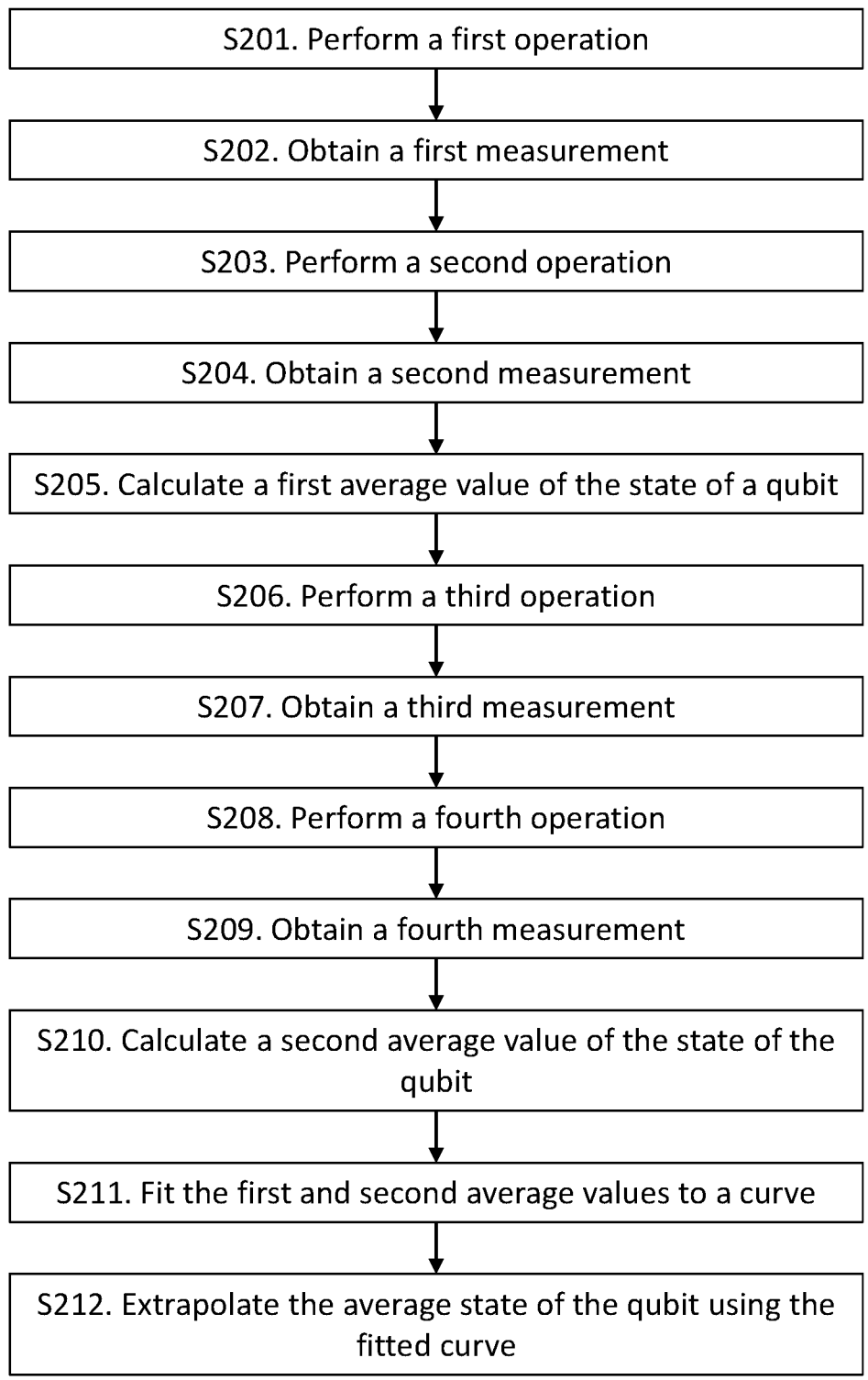
FIG. 2 is a flow chart of an error mitigation method in accordance with a second embodiment.

FIG. 2 is a flow chart depicting an error mitigation method according to another embodiment. In step S201, a first operation is performed on the state of the qubit using a quantum processor. The first operation has a first error rate, $n_1$, which in this embodiment is typically the un-mitigated error rate of the quantum computing system. Typically the un-mitigated error rate is the lowest experimentally achievable error rate. However, hardware variations and other environmental factors may affect the error rate.

The first operation is a gate operation selected by an experimentalist. After performing the first operation, a first measurement of the state of the qubit is obtained in step S202 using a quantum measurement device. The measurement outcome is either +1 or −1, as described in relation to FIG. 1.

In step S203, a second operation is performed on the state of the qubit using the quantum processor. The second operation also has the first error rate, $n_1$. The second operation in this embodiment is the same gate operation that was performed in step S201. After performing the second operation, a second measurement of the state of the qubit is obtained in step S204 using the quantum measurement device.

The gate operation is typically repeated multiple times, and a measurement of the state of the qubit is obtained after each performance of the gate operation. A first average value of the state of the qubit is then calculated in step S205 using a classical processor. The first average value is calculated by averaging the first measurement, the second measurement, and any additional measurements taken. The first average value represents the expected value of the observable at the first error rate.

In step S206, a third operation is performed on the state of the qubit using the quantum processor. The third operation has a second error rate, $n_2$, which is lower than the first error rate, $n_1$, i.e. $n_2 < n_1$. The lower error rate is achieved using quasi-probability techniques as described in relation to FIG. 1. The third operation includes the first operation and a first basis operation. The first basis operation is one of a set of basis operations, and is randomly selected with a first probability using a selection module. A third measurement of the state of the qubit is obtained in step S207 using a quantum measurement device following the performance of the third operation.

In step S208, a fourth operation is performed on the state of the qubit. The fourth operation has the second error rate, $n_2$. The fourth operation includes the first operation and a second basis operation. The second basis operation is one of the set of basis operations, and is randomly selected with a second probability using a selection module. The second basis operation is different from the first basis operation. A fourth measurement of the state of the qubit is obtained in step S208 following the performance of the fourth operation.

The modified gate operation, i.e the first operation followed by a randomly selected basis operation, is typically repeated multiple times. The randomly selected basis operation is selected from a set of basis operations comprising the first basis operation, the second basis operation, and further, different, basis operations. In this embodiment, the set of basis operations used is the Pauli set, and there are four different basis operations for a single qubit operation. The selection of each of the basis operations is weighted according to the coefficients determined using quasi-probability, as described in relation to FIG. 1. A measurement of the state of the qubit is obtained after each performance of the modified gate operation. In this way, the error rate can be reduced by performing additional basis operations following the gate operation.

The gate operation is typically a sequence of operations and may comprise any typical quantum gates such as Pauli or Hadamard gates, and the qubit is one of a group of qubits. The selection module is configured to modify each operation performed on the state of each qubit in the group of qubits. Optionally some operations are not modified and are performed in a normal way. The random nature of the modification provides an unbiased statistical representation of the expected value of the states of the qubits. In this embodiment, for a group of n qubits, the selection module randomly selects a basis operation from a set of $4^n$ basis operations.

A second average value of the state of the qubit is calculated in step S210 by averaging the third measurement, the fourth measurement, and any additional measurements taken. The weighted sampling of possible basis operations $B_j$ according to the determined coefficients $p_j$ experimentally recreates the theoretically determined transformation $$N^{-1} = \sum_j p_j B_j.$$

In this embodiment, the operation having the first error rate and the operation having the second error rate are related as follows: $U_{n1} = NU_{n2}$, in which $n_2 < n_1$. The second average value represents the expected value of the observable at the second error rate. In this embodiment, the operator N is designed to change the form of the errors such that the noise model is simplified.

In step S211, the first and second average values are fitted to a curve using a classical processor. The chosen curve may depend on the theoretical understanding of the relationship between the expected value of the state of the qubit and the error rate. In this embodiment, the curve is an exponential decay curve comprising a single exponential, i.e. $E_n = Ae^{-\gamma n}$, in which $E_n$ is the average state of the qubit, n is an error rate, and A and $\gamma$ are fitting parameters.

In an alternative embodiment, the curve is a multi-exponential decay curve comprising at least two exponentials, i.e.

$$E = \sum_{k=1}^{K} A_k e^{-\gamma_k n}$$

for K>1. In order to fit to a multi-exponential decay curve, further measurements of the average value of the qubit typically need to be obtained to ensure that the curve is not overfitted resulting in a representation of localised noise rather that the overall trend.

Having determined the form of the curve by fitting the first and second average values, the average state of the qubit at a third error rate can be estimated using extrapolation in step S212. The third error rate is lower than the first and second error rates, and in this embodiment is chosen to be zero. In this way, the noise-free value of the observable may be estimated using the classical processor.

Figure 3:
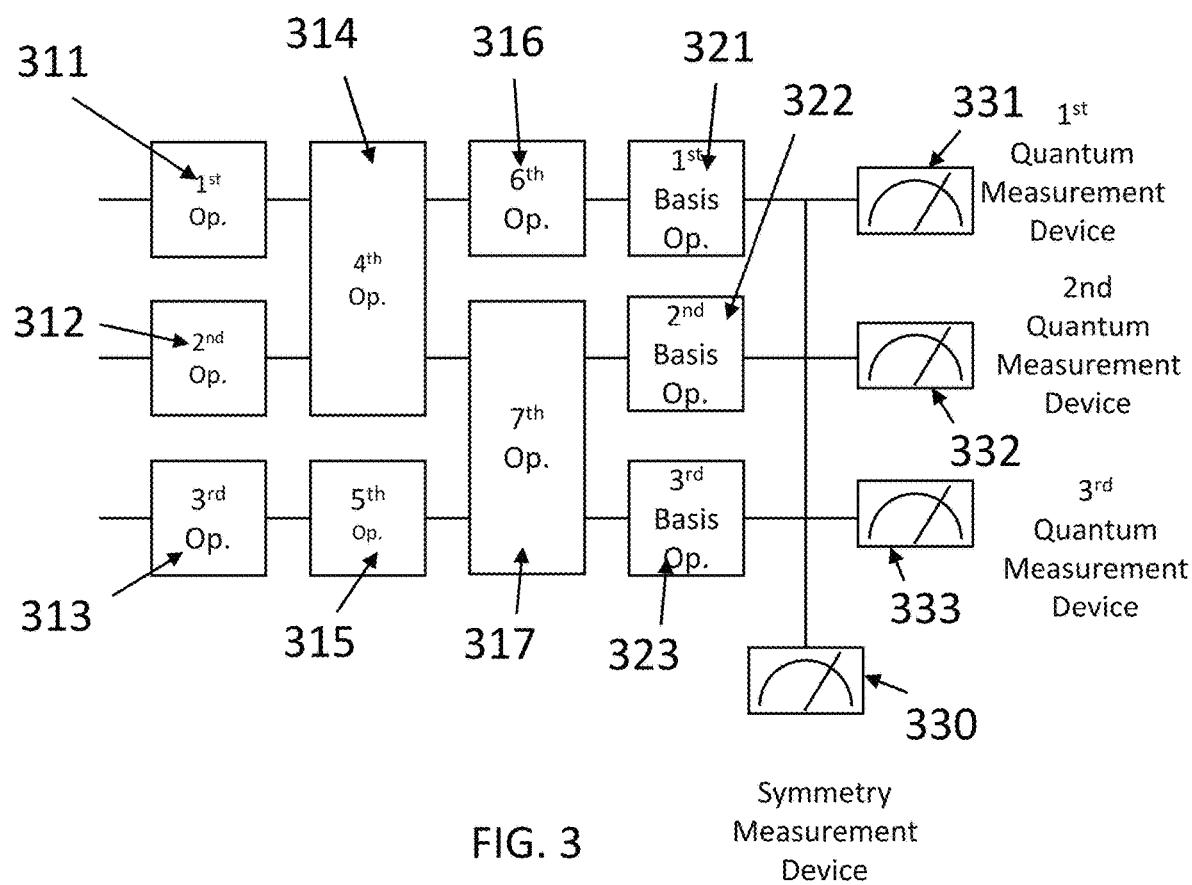
FIG. 3 is a schematic illustration of a quantum computation according to an embodiment.

FIG. 3 is a schematic illustration of a first quantum computation according to an embodiment. In this embodiment, each qubit undergoes a sequence of four operations before being measured. The illustration depicts operations for a group of qubits comprising three qubits, but typically there are 10s or 100s of qubits in the group of qubits.

A first operation 311, a second operation 312 and a third operation 313 are performed on states of the first, second and third qubits respectively. The first, second and third operations 311-313 are performed simultaneously in this embodiment. Each of the first, second and third operations 311-313 are single qubit operations. Subsequently, a fourth operation 314 and a fifth operation 315 are performed. The fourth and fifth operations 314, 315 are performed simultaneously in this embodiment. The fourth operation 314 is a two-qubit operation performed on the first and second qubits, and the fifth operation 315 is a single qubit operation performed on the third qubit. Following this, a sixth operation 316 and a seventh operation 317 are performed. The sixth and seventh operations 316, 317 are performed simultaneously in this embodiment. The sixth operation 316 is a one-qubit operation performed on the first qubit, and the seventh operation 317 is a two-qubit operation involving the interaction of the second and third qubits.

The first to seventh operations 311-317 are gate operations. The first, second, third, fifth and sixth operations, 311, 312, 313, 315, 316 are one-qubit gate operations performed on a qubit in the group of qubits. One or more of the first, second, third, fifth and sixth operations, 311, 312, 313, 315, 316 may be an identity operation. The fourth and seventh operations 314, 317 are two-qubit gate operations performed on two qubits in the group of qubits. Any one-qubit and/or two-qubit operations can be selected according to the requirements of the experiment.

Following the performance of the gate operations as described above, in this embodiment, a first basis operation 321, a second basis operation 322, and a third basis operation 323 are performed on the state of the first, second and third qubits respectively. Each of the first, second and third basis operations 321-323 are randomly selected from a set of basis operations using a selection module. In this embodiment, the set of basis operations is the Pauli set, and there are three operations in the set. The random selection means that the first, second and third basis operations 321-323 may all be different, or only two of them may the same as each other, or they may all be the same.

Following the performance of the sequence of operations, measurements are obtained. In this embodiment, a symmetry measurement is taken using a symmetry measurement device 330. The symmetry measurement device 330 measures a property of the system as a whole. The symmetry measurement in this embodiment is designed such that it does not affect the measurement of the state of each qubit in the group of qubits. For example, the symmetry measurement device 330 may measure the state of an ancilla qubit which is configured to change state upon detection of a specified state change in any of the first, second and third qubits. A measurement of the state of the ancilla qubit can beneficially be taken without collapsing the state of the qubits in the group of qubits.

The quantum computation described may be performed a plurality of times. In this embodiment which includes symmetry verification, a symmetry measurement is obtained after each performance of the quantum computation using the symmetry measurement device 330. The symmetry measurement is a first symmetry outcome if the number of errors is even or a second symmetry outcome if the number of errors is odd.

A first quantum measurement device 331 measures the state of the first qubit. A second quantum measurement device 332 measures the state of the second qubit. A third quantum measurement device 333 measures the state of the third qubit.

The use of a symmetry measurement is optional and in an alternative embodiment only the state of each qubit is measured following the operations. In a further alternative embodiment, each of the operations performed on the group of qubits, i.e. the first, second, third, fourth, fifth, sixth and seventh operations 311-317 may be modified using a randomly selected basis operation.

Figure 4:
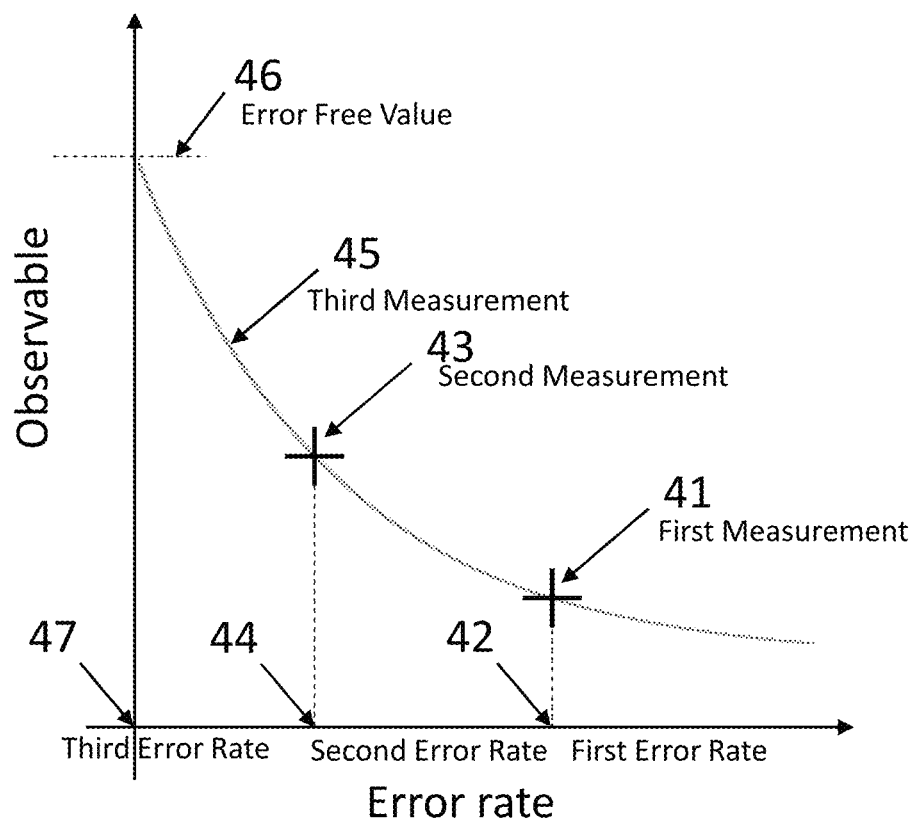
FIG. 4 is a graph illustrating the value of the observable as a function of error rate.

FIG. 4 is an illustration of the fitting and extrapolation process in accordance with an embodiment. The fitting and extrapolation is performed using a processor of a classical computer. A first measurement 41 at a first error rate 42 and a second measurement 43 at a second error rate 44 are obtained using the method described above. The first measurement 41 is less than the second measurement 43 as the first error rate 42 is greater than the second error rate 44.

An exponential decay curve 45 of the form $E=Ae^{-\gamma n}$ is fitted to the first measurement 41 and the second measurement 43 using the classical processor. Having determined the fitting parameters A and $\gamma$, the curve is extrapolated using the classical processor to the third error rate 47. Here, the third error rate 47 is the zero error rate, n=0. The error-free value of the observable 46 is estimated by extrapolating to zero error rate. In an alternative embodiment, further measurements can be performed at additional error rates to improve the estimation of the fitting parameters.

As will be appreciated, an improved error mitigation method is provided in which the estimation of the error-free observable is greatly improved. The combination of error mitigation techniques as described results in an improved estimate of the error-free observable at reduced cost.

The invention claimed is:

1. A method of mitigating errors in quantum computing, wherein the method comprises:
    performing an operation on the state of a qubit in a group of qubits a plurality of times, wherein the operation has a first error rate, and wherein each performance of the operation comprises:
        performing a first operation comprising: a gate operation, a symmetry operation, and a first basis operation; or
        performing a second operation comprising: the gate operation, the symmetry operation, and a second basis operation;
            wherein the first and second basis operations are different basis operations selected from a set of basis operations; and
        measuring the state of the qubit;
        wherein the probability of performing the first operation is a first probability, and the probability of performing the second operation is a second probability;
    obtaining a symmetry measurement for the group of qubits after each performance of the operation using the symmetry operation, wherein the group of qubits comprises a plurality of qubits;
        wherein the symmetry measurement is a first symmetry outcome if the number of errors is even or a second symmetry outcome if the number of errors is odd;
    obtaining a first state measurement by determining the average state of the qubit for the first symmetry outcome;
    obtaining a second state measurement by determining the average state of the qubit for the second symmetry outcome;
    fitting the first state measurement to a first curve having the form $$\frac{A\cosh((1-\gamma)n)}{\cosh(n)};$$

fitting the second state measurement to a second curve having the form $$\frac{A\sinh((1-\gamma)n)}{\sinh(n)};$$

wherein n is an error rate and A and $\gamma$ are fitting parameters; and extrapolating the average state of the qubit at a second error rate using the first and second fitted curves; wherein the second error rate is lower than the first error rate.

2. The method of mitigating errors according to claim 1, wherein the first and second basis operations are selected from a set of basis operations comprising Pauli basis operations.

3. The method of mitigating errors according to claim 1, wherein the first symmetry outcome is a pass and wherein the second symmetry outcome is a fail.

4. The method of mitigating errors according to claim 1, wherein the qubit is a first qubit and wherein the method further comprises: performing the operation on the state of a second qubit in the group of qubits a plurality of times;
  obtaining a third state measurement by determining the average state of the second qubit for the first symmetry outcome;
  obtaining a fourth state measurement by determining the average state of the second qubit for the second symmetry outcome;
  fitting the third state measurement to a third curve and the fourth state measurement to a fourth curve; and
  extrapolating the average state of the second qubit at the second error rate using the third and fourth fitted curves.

5. A device for performing quantum computing calculations, comprising:
  a selection module implemented on a computer readable memory medium comprising instructions which when executed by a computer cause the computer to preform steps comprising:
    selecting a first basis operation from a set of basis operations with a first probability; and
    selecting a second basis operation from a set of basis operations with a second probability;
    wherein the first and second basis operations are different;
  a quantum processor configured to perform an operation on the state of a qubit in a group of qubits a plurality of times, wherein the operation has a first error rate, and wherein each performance of the operation comprises:
    performing a gate operation, a symmetry operation, and the selected basis operation;
  a quantum measurement device configured to measure the state of the qubit;
  a symmetry measurement device configured to measure the symmetry of the group of qubits after each performance of the operation using the symmetry operation, wherein the group of qubits comprises a plurality of qubits;
    wherein the symmetry measurement is a first symmetry outcome if the number of errors is even or a second symmetry outcome if the number of errors is odd; and a classical processor configured to:
    obtain a first state measurement by determining the average state of the qubit for the first symmetry outcome and to obtain a second state measurement by determining the average state of the qubit for the second symmetry outcome;
    fit the first state measurement to a first curve having the form $$\frac{A\cosh((1-\gamma)n)}{\cosh(n)};$$

fit the second state measurement to a second curve having the form $$\frac{A\sinh((1-\gamma)n)}{\sinh(n)};$$

wherein n is an error rate and A and $\gamma$ are fitting parameters; and
    extrapolate the average state of the qubit at a second error rate using the first and second fitted curves, wherein the second error rate is lower than the first error rate.

6. A method of mitigating errors in quantum computing, wherein the method comprises:
  performing a first operation on the state of a qubit, wherein the first operation has a first error rate;
  obtaining a first measurement of the state of the qubit;
  performing a second operation on the state of the qubit, wherein the second operation has the first error rate;
  obtaining a second measurement of the state of the qubit;
  calculating a first average value of the state of the qubit at the first error rate by averaging the first measurement and the second measurement;
  performing a third operation on the state of the qubit, wherein the third operation has a second error rate which is lower than the first error rate and wherein the third operation comprises the first operation and a first basis operation;
  obtaining a third measurement of the state of the qubit;
  performing a fourth operation on the state of the qubit, wherein the fourth operation has the second error rate and wherein the fourth operation comprises the first operation and a second basis operation;
    wherein the first and second basis operations are different basis operations selected from a set of basis operations;
  obtaining a fourth measurement of the state of the qubit;
  calculating a second average value of the state of the qubit at the second error rate by averaging the third measurement and the fourth measurement;
  fitting the first average value of the state of the qubit and the second average value of the state of the qubit to a curve; and
  extrapolating the average stage of the qubit at a third error rate using the fitted curve, wherein the third error rate is lower than the first error rate and the second error rate.

7. The method of mitigating errors according to claim 6, wherein the probability of selecting the first basis operation is a first probability, and the probability of selecting the second basis operation is a second probability.

8. The method of mitigating errors according to claim 6, wherein the set of basis operations comprise Pauli basis operations.

9. The method of mitigating errors according to claim 6, wherein the second operation is the same as first operation.

10. The method of mitigating errors according to claim 6, wherein the qubit is one of a plurality of qubits in a group of qubits.

11. The method of mitigating errors according to claim 6, wherein the curve is an exponential decay curve.

12. The method of mitigating errors according to claim 11, wherein the exponential decay curve is a multi-exponential decay curve of the form $$E = \sum_{k=1}^{K} A_k e^{-\gamma_k n},$$

wherein E is the average state of the qubit, n is an error rate, and $A_k$ and $\gamma_k$ are fitting parameters.

13. A device for performing quantum computing calculations, comprising:
  a selection module implemented on a computer readable memory medium comprising instructions which when executed by a computer cause the computer to preform steps comprising selecting a basis operation from a set of basis operations comprising a first basis operation and a second basis operation, wherein the first and second basis operations are different;
  a quantum processor configured to:
    perform a first operation on the state of a qubit, wherein the first operation has a first error rate;
    perform a second operation on the state of the qubit, wherein the second operation has the first error rate;
    perform a third operation on the state of the qubit, wherein the third operation has a second error rate which is lower than the first error rate and wherein the third operation comprises the first operation and the first basis operation; and
    perform a fourth operation on the state of the qubit, wherein the fourth operation has the second error rate and wherein the fourth operation comprises the first operation and the second basis operation;
  a quantum measurement device configured to obtain first, second, third and fourth measurements after the performance of the first, second, third and fourth operations respectively; and
  a classical processor configured to:
    calculate a first average value of the state of the qubit at the first error rate by averaging the first measurement and the second measurement;
    calculate a second average value of the state of the qubit at the second error rate by averaging the third measurement and the fourth measurement;
    fit the first average value of the state of the qubit and the second average value of the state of the qubit to a curve; and
    extrapolate the average state of the qubit at a third error rate using the fitted curve, wherein the third error rate is lower than the first error rate and the second error rate.

* * * * *